(12) United States Patent
Johnson et al.

(10) Patent No.: US 11,894,788 B2
(45) Date of Patent: Feb. 6, 2024

(54) VARIABLE FREQUENCY DRIVE ELECTRIC HYDRAULIC MATERIAL HANDLER

(71) Applicant: Builtrite, LLC, Two Harbors, MN (US)

(72) Inventors: Karl Eric Johnson, Duluth, MN (US); Mitchell Lloyd Houle, Two Harbors, MN (US)

(73) Assignee: BUILTRITE, LLC, Two Harbors, MN (US)

(*) Notice: Subject to any disclaimer, the term of this patent is extended or adjusted under 35 U.S.C. 154(b) by 550 days.

(21) Appl. No.: 17/088,936

(22) Filed: Nov. 4, 2020

(65) Prior Publication Data

US 2022/0140763 A1 May 5, 2022

(51) Int. Cl.
| | |
|---|---|
| *H02P 25/04* | (2006.01) |
| *H02P 27/04* | (2016.01) |
| *B65G 47/90* | (2006.01) |
| *F15B 13/10* | (2006.01) |
| *F04B 17/03* | (2006.01) |
| *G06F 3/02* | (2006.01) |

(52) U.S. Cl.
CPC ............ *H02P 27/04* (2013.01); *B65G 47/905* (2013.01); *F15B 13/10* (2013.01); *F04B 17/03* (2013.01); *G06F 3/0205* (2013.01)

(58) Field of Classification Search
CPC ....... H02P 27/04; B65G 47/905; F04B 17/03; G06F 3/0205
See application file for complete search history.

(56) References Cited

U.S. PATENT DOCUMENTS

| | | |
|---|---|---|
| 4,102,132 A | 7/1978 | Palmer |
| 4,508,999 A | 4/1985 | Melocik et al. |
| | (Continued) | |

FOREIGN PATENT DOCUMENTS

| | | |
|---|---|---|
| CN | 2685302 Y | 3/2005 |
| CN | 107288955 A | 10/2017 |
| | (Continued) | |

OTHER PUBLICATIONS

Builtrite Model 2100-SE Brochure, Mar. 18, 2016, 2 pgs.
(Continued)

*Primary Examiner* — Muhammad S Islam
(74) *Attorney, Agent, or Firm* — Fredrikson & Byron, P.A.

(57) ABSTRACT

A material handler comprises a motor, an interface device, and a controller. The controller is configured to receive an input from the interface device and can include a variable frequency drive (VFD). The controller provides a variable frequency drive (VFD) signal to the motor to control movement of one or more components of the material handler. If the interface device is inactive for a predetermined amount of time, the controller adjusts a frequency of the VFD signal from an operating frequency to a standby frequency with the standby frequency being lower than the operating frequency. Adjusting the frequency from the operating frequency to the standby frequency can include adjusting the frequency of the VFD signal to one or more intermediate frequencies. When adjusting the frequency of the VFD signal, the controller can skip at least one frequency or range of frequencies, for example, to avoid undesirable operating characteristics.

22 Claims, 5 Drawing Sheets

(56) References Cited

U.S. PATENT DOCUMENTS

| | | | |
|---|---|---|---|
| 5,089,759 | A | 2/1992 | Miotke et al. |
| 5,100,297 | A | 3/1992 | Vitali |
| 5,192,464 | A | 3/1993 | Pawlowski et al. |
| 5,625,262 | A | 4/1997 | Lapota |
| 6,997,221 | B2 | 2/2006 | Kurelek et al. |
| 7,954,574 | B2 | 6/2011 | Schoon |
| 8,344,673 | B2 | 1/2013 | Rotondo et al. |
| 8,561,732 | B2 | 10/2013 | Schoon |
| 8,636,157 | B2 | 1/2014 | Glickman et al. |
| 9,018,882 | B2 * | 4/2015 | Mack ............... H02P 27/06 318/494 |
| 10,031,535 | B2 | 7/2018 | Rollins et al. |
| 2007/0101711 | A1 | 5/2007 | Debus |
| 2007/0289322 | A1 | 12/2007 | Mathews |
| 2011/0180266 | A1 | 7/2011 | Elmbo et al. |
| 2011/0206537 | A1 | 8/2011 | Simpson |
| 2015/0261422 | A1 | 9/2015 | Den Haring et al. |
| 2018/0072281 | A1 | 3/2018 | Bruyere et al. |
| 2018/0170722 | A1 | 6/2018 | Rutherford |
| 2020/0088189 | A1 | 9/2020 | Kidd et al. |
| 2020/0285228 | A1 | 9/2020 | Rulseh et al. |

FOREIGN PATENT DOCUMENTS

| | | |
|---|---|---|
| CN | 110242629 A | 9/2019 |
| EP | 2262073 A2 | 12/2010 |
| EP | 3153397 A1 | 4/2017 |
| EP | 3536864 A1 | 9/2019 |
| JP | S62007384 A | 1/1987 |
| NL | 2020553 B1 | 9/2019 |

OTHER PUBLICATIONS

European Search Report dated May 21, 2021 for related EP Application No. 20209782.0, 10 pgs.

Canadian Office Action dated Jan. 5, 2022 for related CA Application No. 3,100,357.

* cited by examiner

VARIABLE FREQUENCY DRIVE ELECTRIC HYDRAULIC MATERIAL HANDLER

TECHNICAL FIELD

Aspects of this disclosure are directed to material handlers such as electric hydraulic material handlers.

BACKGROUND

Material handlers are machines that can move material from one place to another, for example, using a boom. Electric material handlers may include hydraulic systems to operate and move the boom. In electric material handlers, an electric motor can provide power and drive the hydraulic system including hydraulic pumps and valves. Typically, material handlers use constant speed alternating current (AC) electric motors.

SUMMARY

In some examples, a material handler comprises a motor configured to move one or more components of the material handler. The material handler can also include an interface device and a controller. The controller can be in communication with the motor and the interface device and can be configured to receive an input from the interface device. The controller can also be configured to provide a variable frequency drive (VFD) signal to the motor. The controller can further be configured to control movement of the one or more components of the material handler based on the received input. The VFD signal can have an operating frequency. Additionally, if the interface is inactive for a predetermined amount of time, the controller can be configured to adjust the frequency of the VFD signal from the operating frequency to a standby frequency. The standby frequency can be lower than the operating frequency.

In some embodiments, a controller for a material handler is configured to provide a variable frequency drive (VFD) signal to a motor to effect operation of the motor and the VFD signal can have an operating frequency. The controller can also be configured to detect actuation of an interface device and control the motor via the VFD signal based on the detected actuation of the interface device. Further, if the interface device is idle for a predetermined amount of time, the controller can be configured to adjust the frequency of the VFD signal from the operating frequency to a standby frequency with the standby frequency being lower than the operating frequency.

DETAILED DESCRIPTION

Figure 1:
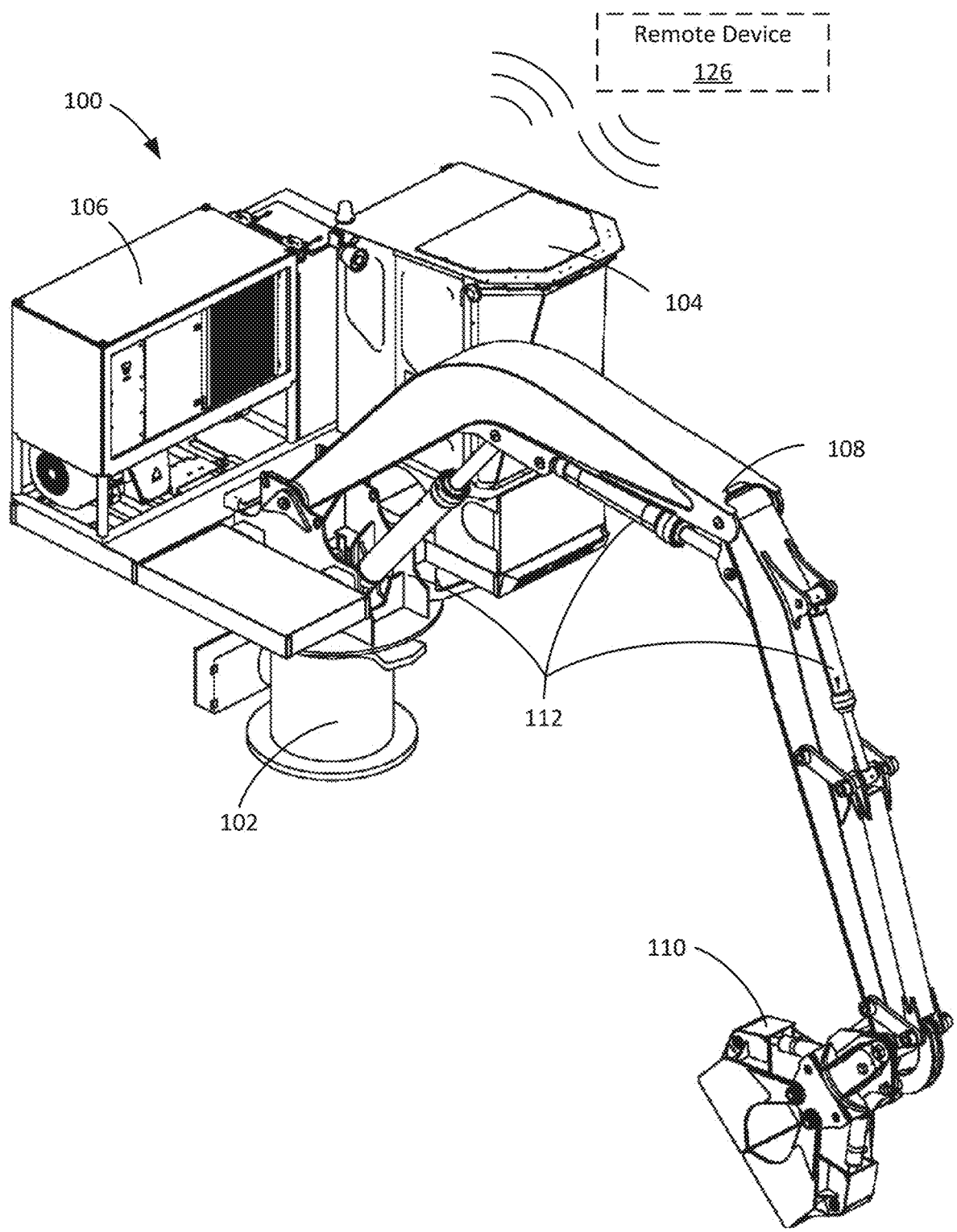
FIG. 1 shows an example material handler.

FIG. 1 shows an example material handler 100 according to some aspects of the present disclosure. The material handler 100 includes a base 102 to which a cabin 104 and an electric motor and hydraulic system 106 are attached. The material handler 100 also includes a boom 108 which is connected to a grapple 110. The grapple 110 can be any type of grapple, but in some examples, the grapple 110 is a tamping grapple. The boom 108 in FIG. 1 has hydraulic cylinders 112 which allow for movement and control of the boom 108 and the grapple 110. In some examples, the material handler 100 is a knuckle boom loader which includes a boom (e.g., boom 108) able to articulate among the various joints of the boom. in some examples, one or more components of the material handler can communicate with a remote device 126, for example, via a wireless or wired connection and/or network connection. In some such examples, remote device 126 can be used to control and/or adjust operating parameters of the material handler 100.

Figure 2:
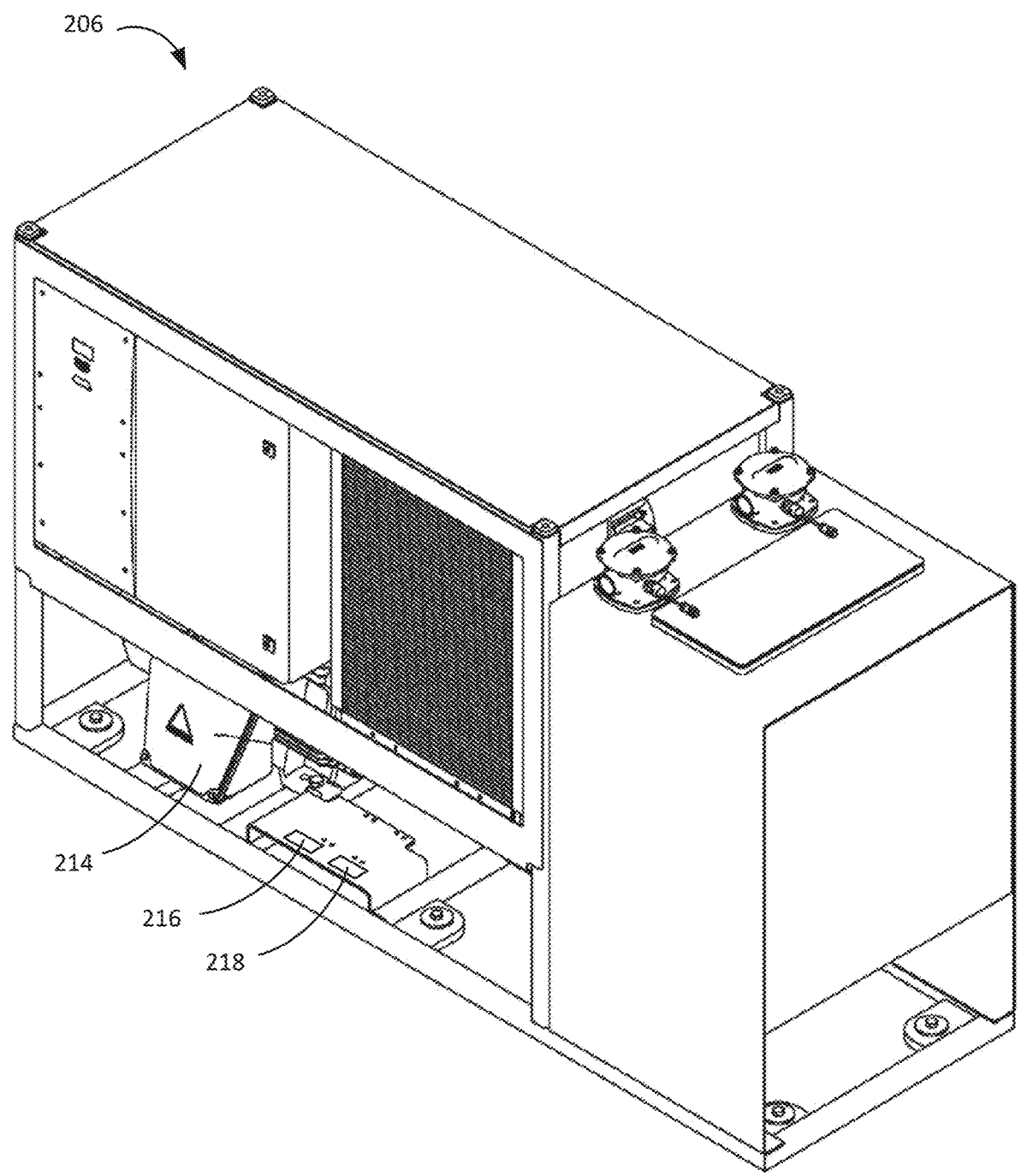
FIG. 2 shows an example electric motor and hydraulic system for a material handler.

FIG. 2 shows an example electric motor and hydraulic system for a material handler. The electric motor and hydraulic system 206 of FIG. 2 includes an electric motor 214, which can drive hydraulic pumps and valves within the electric motor and hydraulic system 206 and other hydraulics within a material handler, such as material handler 100 shown in FIG. 1. The system shown in FIG. 2 also includes hydraulic valves 216, 218 that can connect the electric motor and hydraulic system 206 to one or more hydraulic cylinders, such as the hydraulic cylinders 112 shown in FIG. 1.

During example operation of the material handler of FIG. 1, the electric motor and hydraulic system 206 can change the pressure of hydraulic fluid within the system which can cause the hydraulic cylinders 112 to expand and/or contract. In some examples, operation of the electric motor and hydraulic system 206 can cause individual hydraulic cylinders to expand or contract independently of other hydraulic cylinders. The expansion and/or contraction of the hydraulic cylinders 112 can cause various portions of the boom 108 to move. For example, if all the hydraulic cylinders 112 expand, the boom 108 will extend upward and away from the cabin 104. If all the hydraulic cylinders 112 contract, the boom 108 will contract downward and toward the cabin 104. As individual hydraulic cylinders are expanded or contracted, the corresponding individual portions of the boom 108 can extend or contract. The grapple 110 can include hydraulics that expand or contract to cause the grapple 110 to open or close and allow the grapple to grasp, hold, and release objects. The overall hydraulic system of the material handler 100 can allow the grapple to move to various locations within the reach of the material handler 100, grasp objects, and release the objects in a different location than from where they were grasped.

In some examples, a motor of a material handler can be used for additional or alternative tasks that need not utilize hydraulics. For example, in some embodiments, a motor of a material handler can be configured to drive or rotate one or more portions of the material handler, such as rotation about the base 102. In some embodiments, a plurality of motors can be used to achieve various movements of the material handler. In some such embodiments, one or more such motors can operate according to systems and methods described herein.

Figure 3:
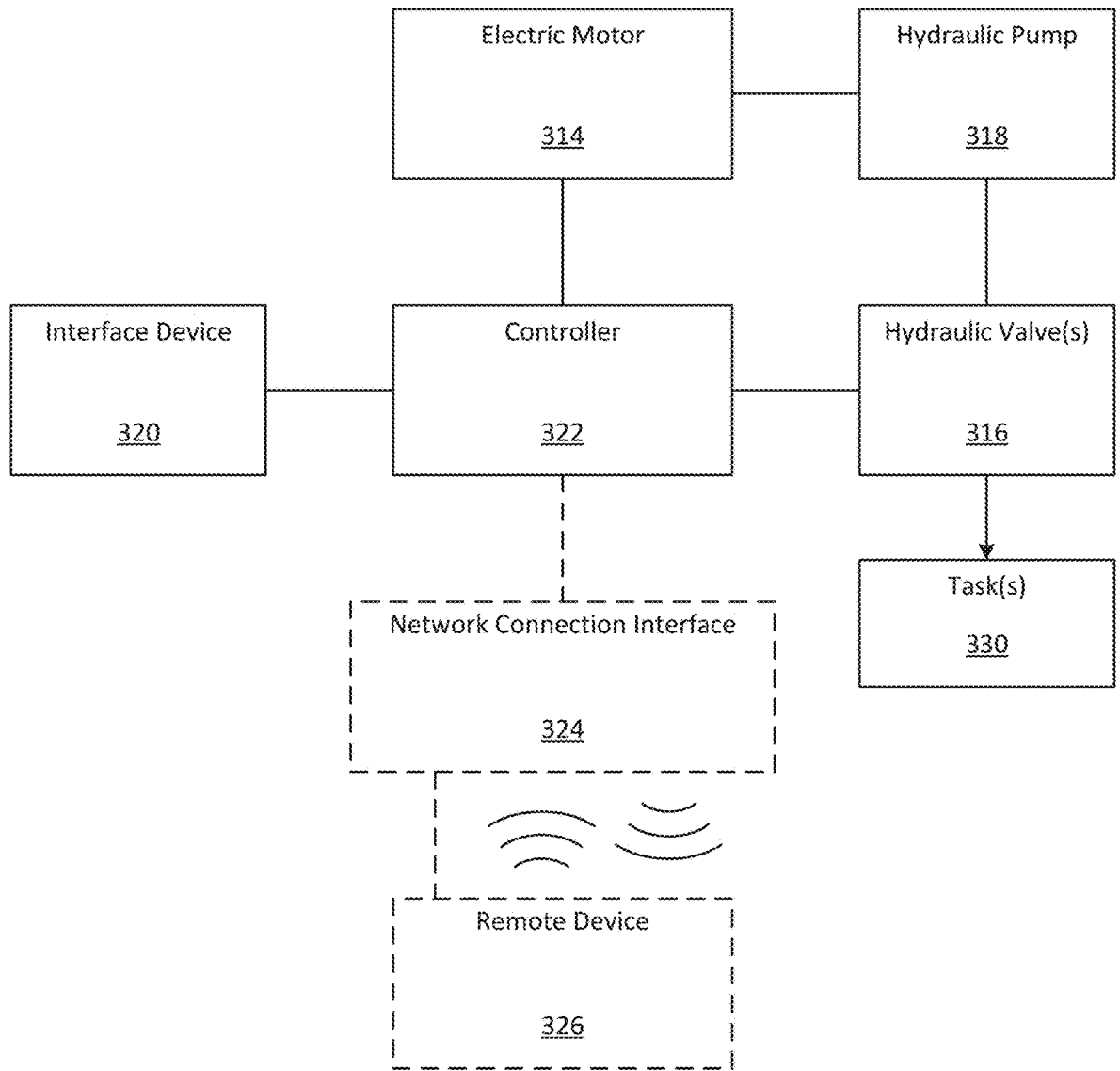
FIG. 3 is a schematic diagram showing aspects of an example material handler.

FIG. 3 is a schematic diagram of a portion of a material handler according to an aspect of the present invention. The illustrated portion includes an electric motor 314 in communication with a hydraulic pump 318 and a controller 322. The hydraulic pump 318 is in communication with one or more hydraulic valves 316. The controller 322 is in communication with the one or more hydraulic valves 316 and an interface device 320. Optionally, in some embodiments, the controller 322 can be in communication with a network connection interface 324 which can be in wired and/or wireless communication with a remote device 326.

While shown as a single component in FIG. 3, in some embodiments, systems can include any number of hydraulic valves configured to facilitate one or more tasks 330 of the material handler. For example, the one or more valves can be used to control machine rotation, grapple operation (e.g., opening/closing, rotation, etc.), movement of one or more booms, or the like.

In various examples, the controller can comprise one or more processors, microprocessors, microcontrollers, application-specific integrated circuits (ASICs) or the like configured to execute various functions described herein. In some embodiments, the controller can include or otherwise be in communication with a memory comprising instructions for causing the controller to carry out one or more such processes.

The electric motor 314 can be any type of electric motor, however, in some examples, the electric motor 314 is an AC electric motor (e.g., 3-phase induction motor). In some examples, the electric motor 314 is a constant speed AC electric motor. In such examples, the electric motor 314 operates at a constant speed for a given frequency of applied AC voltage, and the operating speed changes with the applied frequency. For instance, in an example embodiment, a constant speed electric motor can produce a constant speed of 1800 rotations per minute (rpm) when the frequency of AC voltage provided to the constant speed electric motor is 60 Hertz (Hz). However, if the frequency of the AC voltage provided to the constant speed electric motor changes to 30 Hz, the speed of the electric motor can change to 900 rpm. Thus, by changing the frequency of the AC voltage provided, the operating speed of the constant speed electric motor can be adjusted. Additionally or alternatively, the AC voltage itself can be adjusted to adjust the speed of the constant speed electric motor. In some such examples, changes in the AC voltage correspond with changes in the frequency of the AC voltage.

Changing the rpm of the electric motor 314 can cause the hydraulic pump 318 to change the pressure and/or flow of hydraulic fluid in the material handler. Changing the pressure and/or flow of hydraulic fluid in the material handler can allow the material handler to operate (e.g., moving materials from one location to another) using hydraulic cylinders.

In the example of FIG. 3, the controller 322 is in communication with the electric motor 314 and can control the operation of the electric motor 314. In some examples, the controller 322 includes a variable frequency drive (VFD) while in some examples, the controller is a VFD.

In the illustrated example, the controller 322 is also in communication with an interface device 320. The controller 322 can receive inputs, such as signals, from the interface device 320 and can output specific voltages, voltage frequencies, currents, and other signals to the electric motor 314 in response to received inputs. In some examples, the controller 322 can detect actuation of the interface device 320 and can control the electric motor 314 with various signals based on the detected actuation of the interface device 320.

In some examples, the controller 322 can output a VFD signal to the electric motor 314. The VFD signal can affect the operation of the electric motor and can cause movement of one or more components of the material handler. The VFD signal can have a frequency, such as an operating frequency. For example, the controller 322 can output a VFD signal which has an operating frequency of 60 Hz, for example, to operate the motor at a particular speed. The VFD signal can include start and stop programs for controlled acceleration and deceleration of components driven by the motor. Additionally, standard drive systems for material handlers often encounter large inrush currents upon startup (e.g., six or seven times a full load amps value). VFD operation can reduce or eliminate the inrush current associated with startup, and in some cases, the VFD starts operating at the full load amp value rather than multiple times that value. In some embodiments, the VFD can control operation to allow full startup and operation of the material handler while staying at or below a full load amps value at all times. Moreover, in some examples, the VFD makes full motor torque available at all times while maintaining the current at or below the full load amps value. Reducing the amperage required for startup can reduce wear and save energy.

Further, in some examples, the controller 322 can adjust the frequency of the VFD signal from an operating frequency to a standby frequency, for example, when the electric motor 314 is not being used to operate the material handler. In some examples, the standby frequency is lower than the operating frequency and draws less power than the operating frequency.

In some examples, the controller can include a timer or other timekeeping device (e.g., an internal clock) that can determine an amount of time that has passed since the most recent signal was received from the interface device 320 or another device (e.g., remote device 326) for operating the electric motor 314. The controller 322 can determine when the interface device 320 or another device (e.g., remote device 326) was last active and/or how long it has been inactive (e.g., idle) using the timer or other timekeeping device.

In some examples, the controller includes non-transitory memory which can be programmed to retain a specific amount of time. In some such examples, the specific amount of time is a predetermined amount of time which can be varied. In some examples, the predetermined amount of time can be different for different interface devices. In some further examples, the controller 322 can include the timer or other timekeeping device and the non-transitory memory programmed to retain a predetermined amount of time, and can use both to determine if the interface device 320 has been inactive for the predetermined amount of time. For instance, in an example embodiment, the controller can determine if the interface device 320 has been inactive for a period of five minutes or longer. In some examples, if the controller determines the interface device has been inactive for the predetermined amount of time, the controller can be configured to perform another action as is described elsewhere herein.

In various examples, the interface device 320 can be any device with which an operator can interface such that the interface device sends signals to the controller 322, for example, to control electric motor 314. In some examples, the interface device 320 is a device comprises a joystick or lever. In such examples, the operator can actuate the interface device 320 and the interface device 320 can send signals corresponding to the specific actuation by the operator to the controller 322. In some examples, the interface device 320 can include buttons, switches, or other input devices which can receive input from the operator and communicate the input to the controller 322. Further, in some examples, interface device 320 can include more than one device. For example, the interface device 320 can include multiple joysticks. In some examples, the interface device 320 can include one or more joysticks with buttons and/or switches.

Optionally, in some examples, the controller is in communication with network connection interface 324. In some examples, the network connection interface 324 is part of the material handler. The network connection interface 324 can in wired and/or wireless communication with a remote device 326. The network connection interface 324 is configured to receive signals from the remote device 326 and relay the received signals to the controller 322. In some examples, the network connection interface 324 is further configured to send signals from the controller 322 to the remote device 326. In some examples, the network connection interface 324 uses wired protocols such as ethernet and/or Modbus to communicate with the remote device 326. In some examples, the network connection interface 324 uses wireless protocols such as Wi-Fi and/or Bluetooth. In some examples, the network connection interface 324 can use more than one protocol which can include wired and wireless protocols.

The remote device 326 can be any remote device configured to send signals to the controller 322 through the network connection interface 324. In some examples, the remote device 326 can function in similar ways to the interface device 320, for example, by providing inputs to the controller 322. In some examples, the remote device 326 is an interface device that is located remotely from the material handler. In such examples, the remote device 326 provides signals to the controller 322 through the network connection interface 324. Additionally or alternatively, in some embodiments, the remote device 326 can update one or more operating parameters of the material handler, such as an operating frequency of a VFD signal emitted from the controller 322 to drive the electric motor 314. In some examples, the remote device 326 can receive signals from the controller 322 through the network connection interface 324. Such signals can include, for example, status signals indicating the status of one or more system components. In various examples, a remote device 326 can include a computer, smartphone, tablet, or other device configured to communicate over a network, such as via the internet. In some examples, a remote device can include one or more components configured to communicate locally with the material handler, for example, via a local area network, Bluetooth communication, a wired communication, or the like.

In an example operation of the example of FIG. 3, the controller 322 receives an input from the interface device 320. The input can be an input signal, such as a signal from a joystick, corresponding to desired movement of one or more components of the material handler (e.g., a boom). In some examples, the controller 322 provides a VFD signal to the electric motor 314, which controls movement of such one or more components, for example, through hydraulics. The VFD signal can include an operating frequency controlling the operating speed of the electric motor 314, and the electric motor 314 can operate according to the VFD signal, for example, by driving the hydraulic pump 318 to extend the boom of the material handler. Thus, in such operations, the interface device 320 controls the operation of the boom of the material handler through the controller 322, the electric motor 314, the hydraulic pump 318, and any hydraulic cylinders. In some embodiments, the VFD signal can control the operating speed of the electric motor 314 while maintaining a constant torque at the motor.

In some examples, during or after operation, the interface device 320 can be inactive for an amount of time. For example, an operator can stop actuating the interface device 320. If the interface device 320 is inactive, the controller 322 can determine an amount of time that has passed since the interface device 320 was last active. If the interface device 320 is inactive for a predetermined amount of time, the controller 322 can adjust the frequency of the VFD signal. In some examples, the controller 322 is programmed to determine when a predetermined amount of time has elapsed from when the interface device 320 was last active, and if the predetermined amount of time has elapsed adjust the frequency of the VFD signal.

In some examples, adjusting the frequency of the VFD signal comprises decreasing the frequency. In some such examples, the controller can decrease the frequency of the VFD signal from an operating frequency to a standby frequency.

In some examples, the operating frequency is 60 Hz, however, in some examples, the operating frequency is less than or greater than 60 Hz. For instance, in some embodiments, the operating frequency is between 50 Hz and 75 Hz. In some such embodiments, the operating frequency is between 53 Hz and 72 Hz.

In some examples, the standby frequency is lower than the operating frequency. In some examples, the standby frequency is 0 Hz, and in some examples, the standby frequency is greater than 0 Hz. Further, in some examples, the standby frequency is between 20 Hz and 30 Hz.

In an example of decreasing the frequency of the VFD signal, the operating frequency can be 60 Hz while the standby frequency can be 24 Hz and the controller can adjust the frequency of the VFD signal from 60 Hz to 24 Hz if the interface device 320 is inactive for a predetermined amount of time. It can be advantageous to decrease the frequency of the VFD signal from an operation frequency to a standby frequency, as a lower VFD signal frequency can correspond with lower power consumption of the electric motor and/or other connected parts of the material handler. It can also be advantageous to decrease the frequency of the VFD signal from an operation frequency to a standby frequency reducing the frequency can decrease the noise produced by the electric motor and/or other connected of the material handler, making the environment proximate the material handler more comfortable when the material handler is not being used, even temporarily.

In some examples, adjusting the frequency of the VFD signal from an operating frequency to a standby frequency can include adjusting the frequency to one or more intermediate frequencies before adjusting the frequency of the VFD signal to the standby frequency. In some examples, each of the one or more intermediate frequencies are between the operating frequency and the standby frequency. Further, any number of intermediate frequencies can be used to adjust the frequency of the VFD signal from an operating frequency to a standby frequency.

In some examples, the controller can predetermine the intermediate frequencies between the operating frequency and the standby frequency. In some such examples, the predetermined intermediate frequencies can be implemented in a predefined sequence when transitioning from the operating frequency and the standby frequency. For example, the controller can be configured to, when transitioning from an operating frequency of 60 Hz to a standby frequency of 20 Hz, produce a VFD signal with intermediate frequencies of 50 Hz, 40 Hz, and 30 Hz. In such an example, the controller can adjust the frequency of the VFD signal in a predetermined sequence of descending frequencies.

In some examples, a material handler can have one or more associated operating frequencies that cause negative operating conditions. For example, in some cases, one or more frequencies of the VFD signal can cause the material handler to vibrate undesirably (e.g., due to harmonics in one or more motor or coupler mechanical systems), which can be uncomfortable to the operator, make the material handler more difficult to operate, and/or harm the material handler itself. Additionally or alternatively, in some embodiments, such vibration can lead to premature hydraulic connection failure, part failure, additional stress on one or more components, leaks in or between one or more components, or the like.

In some examples, the intermediate frequencies applied by the VFD when adjusting the frequency from the operating frequency to the standby frequency can be part of a set of intermediate frequencies. In such examples, the controller can adjust the frequency of the VFD signal to each of one or more intermediate frequencies in a first set of intermediate frequencies between the operating frequency and the standby frequency. In some examples, the controller be configured to exclude frequencies in a second set of intermediate frequencies between the operating frequency and the standby frequency. Frequencies in the second set of intermediate frequencies can include on or more predetermined frequencies and/or frequency ranges, such as frequencies or ranges of frequencies that cause undesirable vibration of the material handler. By excluding one or more intermediate frequencies in the second set of intermediate frequencies, the controller can avoid operating the electric motor at undesirable frequencies. A variety of further operations for adjusting the frequency of the VFD signal are contemplated and some examples are described with respect to FIGS. 4A and 4B.

Figure 4A:
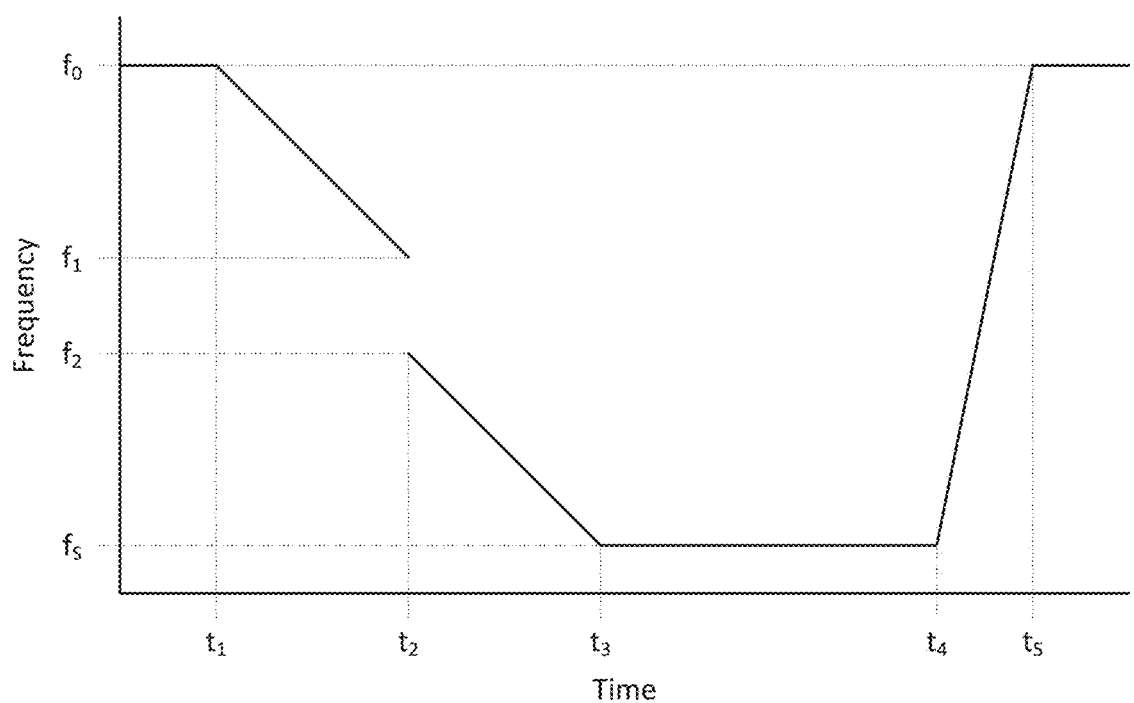
FIGS. 4A and 4B show example graphs of frequency vs. time for an example VFD signal sent by a controller to an electric motor according to some aspects of the present disclosure.
Figure 4B:
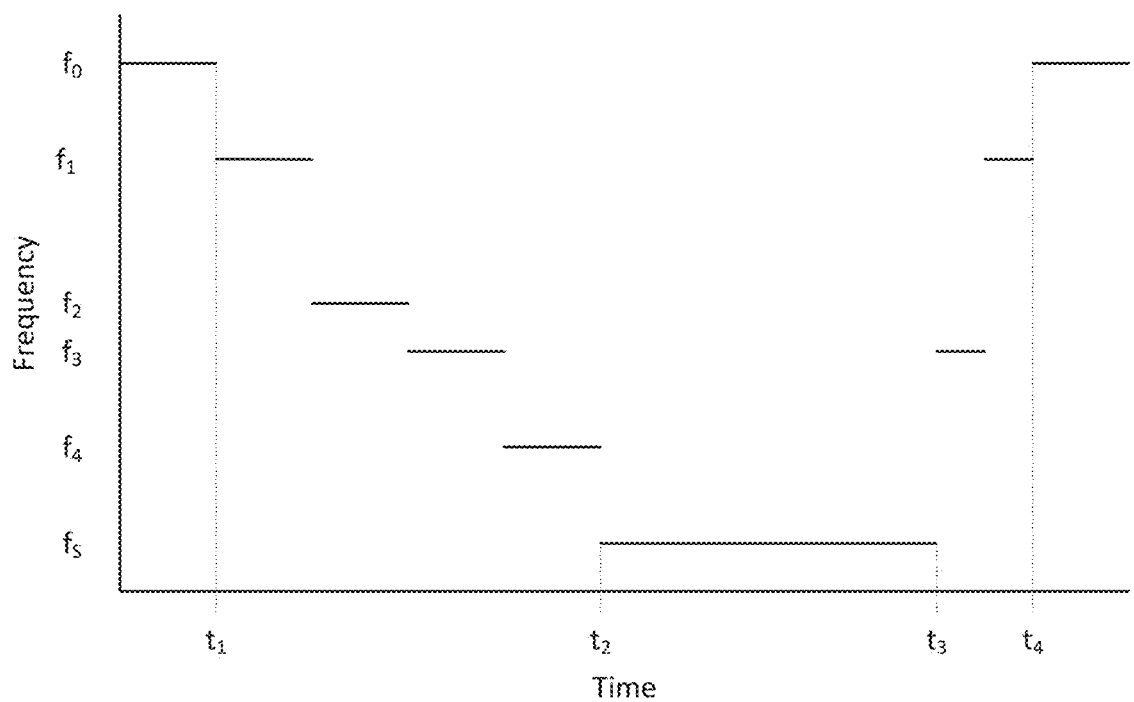

FIGS. 4A and 4B show example graphs of frequency (e.g., in Hz) vs. time (e.g., in seconds) for an example VFD signal sent by a controller (e.g., 322 of FIG. 3) to an electric motor (e.g., 314) according to examples of the present disclosure. In the example of FIG. 4A, the VFD signal starts at an operating frequency $f_0$. The operating frequency can be a frequency determined to be a desirable operating frequency, for example, that does not induce undesirable vibration in the system. In various examples, such an operating frequency can be determined in the factory and/or in place during operation. In some examples, the operating frequency is between 50 Hz and 70 Hz. In some examples, the operating frequency is approximately 60 Hz.

In the example of FIG. 4A, the controller has determined that an interface device (e.g., 320) has been inactive for a predetermined amount of time as of time $t_1$. In the illustrated example, at time $t_1$, the controller starts to adjust the frequency of the VFD signal from the operating frequency $f_0$ to a standby frequency $f_s$. In the illustrated example, the controller reduces the frequency at a substantially constant rate. In some such examples, the substantially constant rate comprises a decrease of approximately 1 Hz per second. However, in some examples, the rate can be higher or lower than 1 Hz per second and, in some examples, the rate can be within a range of acceptable rates, for example, between 0.25 Hz per second and 10 Hz per second. In some examples, decreasing the frequency of the VFD signal by a substantially constant rate second can be considered ramping down the frequency.

In some examples, the frequency of the VFD signal smoothly transitions from one frequency to another frequency. For example, the frequency can decrease from 60 Hz to 59 Hz over the period of 1 second. During that time, the frequency of the VFD signal can pass through 59.75 Hz, 59.5 Hz, 59.25 Hz and other frequencies between 60 Hz and 59 Hz. In such examples, the frequency can maintain the same decrease of 1 Hz/second (e.g., a linear decrease) whereby the frequencies 59.75 Hz, 59.5 Hz, 59.25 Hz correspond with the times of 0.25 seconds, 0.5 seconds, and 0.75 seconds, respectively. In some examples, the smooth transition can be limited to 0.01 Hz and/or 0.01 second increments between changes.

However, in some examples, the frequency of the VFD signal is not a smooth transition from one frequency to another frequency. For example, the frequency can decrease from 60 Hz to 59 Hz without passing through any frequencies between 60 Hz and 59 Hz. In some such examples, each discrete frequency is maintained for approximately one second and then decreases to the next discrete frequency (e.g., from 60 Hz to 59 Hz). For instance, in some examples, the frequency is 60 Hz at 0.99 seconds and reduce to 59 Hz before 1.01 seconds.

In an example embodiment, frequency is decreased continuously in 0.1 Hz increments until a desired frequency is reached. In some embodiments, the incremental change in frequency is a function of the frequency resolution and/or adjustment speed of the VFD and/or a time allotted to adjust the frequency. For example, in some embodiments, the system can be configured to reduce the frequency from an operating frequency to a standby frequency within a predetermined amount of time (e.g., five seconds). The VFD controller can be configured to decrease the frequency by an appropriate incremental amount so that the VFD signal decreases from the operating frequency to the standby frequency within a predetermined amount of time.

In some examples, when the controller is adjusting the VFD signal, the VFD signal can skip one or more frequencies or frequency ranges. In some examples, this means the frequency that would otherwise be realized by the VFD signal is not realized. For instance, in the illustrated example, as the frequency decreases from $f_0$ toward $f_s$, frequencies between $f_1$ and $f_2$, which are between $f_0$ toward $f_s$ and would otherwise be realized when decreasing the frequency from $f_0$ to $f_s$, are skipped at time $t_2$. In this case, skipping a frequency indicates that the frequency does not necessarily change at a constant rate (e.g., at 1 Hz per second) over the entire range of frequencies when moving from an operating frequency to a standby frequency.

In some examples, the amount of time it takes to skip a frequency or range of frequencies can vary. In some examples, the amount of time it takes to skip a range of frequencies is correlated to the size of the range of frequencies. For example, if skipping takes a long time, the range of frequencies skipped can be larger than it would have been if skipping took a shorter amount of time. In some examples, the size of the skipped range of frequencies depends on a predetermined duration of skipping the frequencies and the rate at which the frequencies are changing.

While shown as a frequency range in FIG. 4A, in some embodiments, a single frequency can be skipped that would otherwise be realized. For example, in an embodiment decreasing from an operating frequency of 60 Hz to a standby frequency of 25 Hz in 1 Hz increments, frequencies between and including 40 and 50 Hz can be skipped. In other embodiments, only the frequency of 45 Hz is skipped. In general, any number of individual frequencies and frequency ranges of any size can be skipped to avoid undesirable frequencies.

In some examples, the range of frequencies skipped are predetermined by the controller. For instance, as described elsewhere herein, in some cases, one or more frequencies may cause undesirable vibrations within the system. The controller can be configured to skip such frequencies or a range of frequencies including one or more such frequencies. For example, in some material handlers, such one or more frequencies can cause a boom (e.g., 108 of FIG. 1) to vibrate excessively which can damage or cause excess wear on the boom.

In some embodiments, frequencies or ranges of frequencies to be skipped can be preprogrammed, for example, during manufacturing and/or during use. Such frequencies can be determined experimentally, for example, by operating the material handler at a plurality of frequencies and determining one or more undesirable frequencies or range of frequencies, such as those that cause undesirable vibration within the system. In some examples, such values can be implemented via a user interface and/or a remote device.

As shown in FIG. 4A, the frequency decreases from the operating frequency $f_o$ starting at time $t_1$, skips frequencies within the frequency range between $f_1$ and $f_2$ at $t_2$, and then decreases from $f_2$ until it reaches the standby frequency $f_s$ at time $t_3$. In some examples, $f_1$ is 35 Hz and $f_2$ is 28 Hz, whereby the range of frequencies skipped as the frequency decreases to the standby frequency $f_s$ comprise frequencies between 35 Hz and 28 Hz. In some examples, the standby frequency is between 20 Hz and 30 Hz. In some such examples, the standby frequency is between 21 Hz and 25 Hz, and in some such examples, the standby frequency is approximately 24 Hz.

While the frequency is shown in FIG. 4A as decreasing from $f_1$ to $f_2$ instantly at time $t_2$, in some embodiments, the frequency change is not immediate. For example, in some embodiments, the controller can be configured to stop applying a VFD signal at time $t_2$ when the frequency is $f_1$, and can continue applying a VFD signal having frequency $f_2$ at a later time $t_2+\Delta t$, wherein $\Delta t$ represents a delay between the times when frequencies $f_1$ and $f_2$ are present. In some embodiments, a controller can be configured to stop applying the VFD based on time rather than frequency, for example, stopping applying the VFD signal between time $t_2$ and $\Delta t$ so that the frequencies between $f_1$ and $f_2$ are skipped.

In some examples, the amount of time it takes to decrease the frequency from the operating frequency $f_o$ to the standby frequency $f_s$ ($t_3-t_1$) is between 1 seconds and 60 seconds. In some examples, the amount of time ($t_3-t_1$) is between 4 seconds and 6 seconds, and in some examples, is approximately 5 seconds.

Once the standby frequency is reached at time $t_3$, frequency stops decreasing and remains at the standby frequency $f_s$. The frequency of the VFD signal can remain at the standby frequency for any amount of time. However, in some examples, the VFD signal can remain at the standby frequency until the controller detects activity from the interface device. In some examples, activity from the interface device can include actuation of the interface device.

In the example of FIG. 4A, at time $t_4$, the controller has detected activity from the interface device and starts to adjust the frequency of the VFD signal from the standby frequency $f_s$ to the operating frequency $f_o$. As shown, the frequency of the VFD signal increases (e.g., ramps up) over an amount of time from the standby frequency to the operating frequency. In some examples, the VFD signal passes through one or more intermediate frequencies as it increases from a standby frequency to an operating frequency. In some examples, the VFD signal skips frequencies in a similar manner as described elsewhere herein with respect to decreasing the frequency of the VFD signal. In other examples, such as shown in FIG. 4A, the VFD signal does not skip frequencies when increasing from the standby frequency to the operating frequency.

In the example shown in FIG. 4A, the frequency increases from the standby frequency to the operating frequency, such as when actuation of an interface device is detected, more quickly than it decreases from the operating frequency to the standby frequency. For example, in some embodiments, the time it takes to increase the frequency from the standby frequency $f_s$ to the operating frequency $f_o$ ($t_5-t_4$) is between 0.5 seconds and 5 seconds. In some embodiments, the time ($t_5-t_4$) is between 1 second and 2 seconds, and in some embodiments, the time is approximately 1.8 seconds. Quick responses to activity from the interface device can be desirable so that a user may quickly operate the machine. Additionally, in the illustrated example, there are no frequencies or frequency ranges skipped when increasing the frequency. In some examples, when quickly increasing the frequency of the VFD signal, the VFD signal quickly moves through frequencies or ranges of undesirable frequencies.

FIG. 4B shows another example graph of frequency (in Hz) vs. time (in seconds) for an example VFD signal sent by a controller (e.g., 322 of FIG. 3) to an electric motor (e.g., 314) according to examples of the present disclosure. In the example of FIG. 4B, the VFD signal starts at an operating frequency $f_o$. Similar to FIG. 4A, at time $t_1$ the controller begins to reduce the frequency from the operating frequency toward a standby frequency $f_s$. In the example of FIG. 4B, the controller changes the frequency of the VFD signal in a plurality of discrete steps, changing the frequency from the operating frequency $f_o$ to each of a plurality of intermediate frequencies $f_1$, $f_2$, $f_3$, and $f_4$ before reaching the standby frequency $f_s$. In some such examples, the intermediate frequencies can be selected to avoid undesirable frequencies (e.g., frequencies that cause undesirable vibration). Such frequencies can be selected, for example, during factory calibration or during use. In various embodiments, any number of intermediate frequencies can be used, and the VFD signal can include any intermediate frequency for any duration. Moreover, the duration of each intermediate frequency need not be equal to the duration of any other intermediate frequency.

In the example of FIG. 4B, after applying intermediate frequencies $f_1$, $f_2$, $f_3$, and $f_4$, the controller operates the material handler at the standby frequency starting at time $t_2$. The controller applies the standby frequency until time $t_3$, and then begins to increase the frequency to the operating frequency, for example, in response to detected actuation of the interface device. In the illustrated example, when increasing from the standby frequency to the operating frequency, the controller applies intermediate frequencies $f_3$ and $f_1$ before reaching the operating frequency at time $t_4$. In various examples, intermediate frequencies when increasing from the standby frequency to the operating frequency need not equal any of the intermediate frequencies applied when decreasing the frequency from the operating frequency to the standby frequency. Any number of intermediate frequencies can be used when increasing or decreasing the frequency. Additionally or alternatively, similar to described with respect to FIG. 4A, while frequency changes are shown as happening at certain times (e.g., $t_1$), in some embodiments, the change of frequencies is not instantaneous. For example, in some embodiments, the frequency may change from $f_o$ at time $t_1$ to $f_2$ at time $t_1+\Delta t$.

In some examples, processes such as those shown in FIGS. 4A and 4B can be combined. For example, in some embodiments, after an interface device has been idle for a predetermined period of time, the controller can decrease the frequency from the operating frequency to the standby frequency in a way similar to that shown in FIG. 4A. However, the controller can be configured, when the interface device is actuated, increase the frequency from the standby frequency to the operating frequency in a manner similar to that shown in FIG. 4B, applying one or more discrete intermediate frequencies. The reverse is also possible, applying a technique similar to that shown in FIG. 4B when decreasing the frequency and one similar to that shown in FIG. 4A when increasing the frequency.

In some examples, the controller is configured to adjust the operating frequency of the VFD signal from a first operating frequency to a second operating frequency. For example, a first operating frequency for the VFD signal can be 60 Hz while a second operating frequency can be 50 Hz. The controller can adjust the frequency of the VFD signal to from 60 Hz to 50 Hz. The first operating frequency and the second operating frequency can be any frequencies and the first frequency can be greater or less than the second frequency. In some examples, the first operating frequency and the second operating frequency are selected from a predetermined list of available operating frequencies. In some such examples, the controller can select the first and second operating frequencies. In some further examples, the controller can predetermine the available frequencies.

As discussed elsewhere herein, the controller can be in communication with a remote device and can be configured to receive a control signal from the remote device. In some such embodiments, the controller can receive a control signal from the remote device via a network connection interface. In some examples, the controller can be configured to adjust the operating frequency from a first operating frequency to a second operating frequency in response to the received control signal. For example, the controller can provide a first operating frequency of 60 Hz to the electric motor. Upon receiving a control signal from the remote device via the network connection interface, the controller can adjust the operating frequency from the first operating frequency of 60 Hz to a second operating frequency of 50 Hz. In this way, the remote device can communicate various operating frequencies to the material handler.

Additionally or alternatively, in some embodiments, the controller can be configured to adjust the operating frequency from a first operating frequency to a second operating frequency in response to a command received via the interface device or other user interface. A user may adjust the operating frequency, for example, in response to detected undesired vibrations when operating the material handler. Additionally or alternatively, a user may adjust the operating frequency in order to adjust the operating speed of the material handler. In some embodiments, the operating frequency can be adjusted to frequency included in a predefined list of available operating frequencies, such as operating frequencies known to minimize undesirable system operation (e.g., vibration, etc.). In some examples, the operating frequency is restricted to a frequency range.

For example, in some embodiments, the operating frequency is limited to frequencies at or below a maximum operating frequency. In some embodiments, limiting frequencies to a maximum operating frequency can avoid possible undesirable operation or other consequences at operating the motor at high speeds. In some embodiments, the maximum operating frequency is between 70 Hz and 75 Hz, for example, 72 Hz.

Additionally or alternatively, in some embodiments, the operating frequency is limited to frequencies at or above a minimum operating frequency. In some examples, the minimum operating frequency is between 50 Hz and 55 Hz, for example, 53 Hz.

Figure 5:
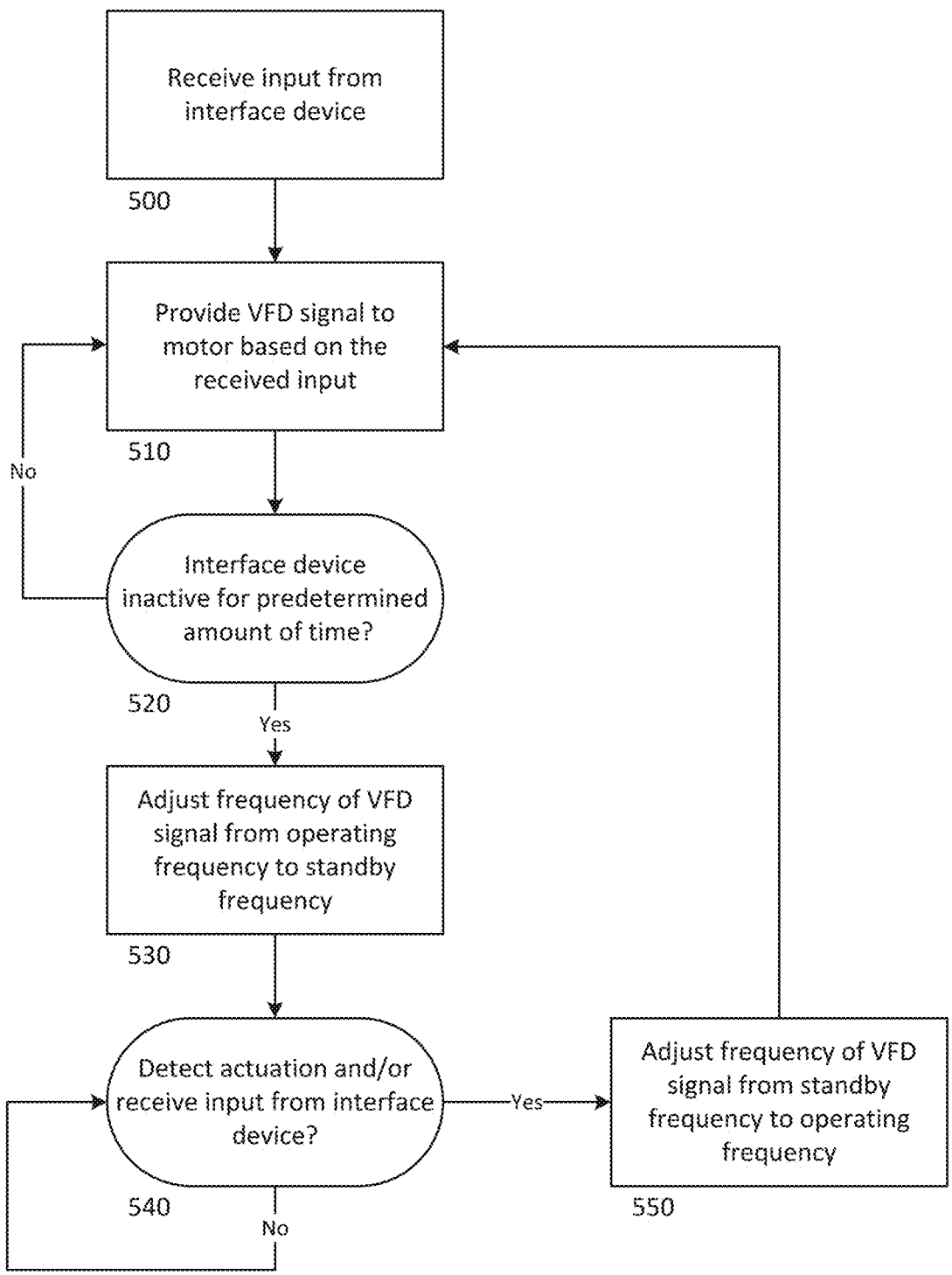
FIG. 5 is a flow diagram illustrating example operation of a controller of a material handler according to some aspects of the present disclosure.

Moving to FIG. 5, FIG. 5 is an example operation of a controller of a material handler according to an aspect of the present disclosure. Starting at 500, the controller receives an input from an interface device. In some examples, the input is a signal meant to control aspects of the material handler such as the boom and/or grapple. Moving to 510, the controller provides a VFD signal at an operating frequency to a motor in communication with the controller base on the received input from the interface device.

At step 520, the controller determines if the interface device has been inactive/idle for a predetermined amount of time. If the controller determines the interface device has not been inactive for a predetermined amount of time (e.g., the interface device is active), the controller continues to provide the VFD signal to the motor based on the received input from the interface device as in step 510. However, if the controller determines the interface device has been inactive for a predetermined amount of time, the operation continues with step 530.

At step 530, the controller adjusts the frequency of the VFD signal from the operating frequency to a standby frequency. Adjusting the frequency can comprise many different steps and various operations as is described elsewhere herein. For example, in some embodiments, reducing the frequency from the operating frequency to the standby frequency comprises adjusting the frequency to a plurality of intermediate frequencies between the operating frequency and the standby frequency. In some instances, one or more frequencies or frequency ranges are excluded when decreasing the frequency from the operating frequency to the standby frequency, for example, to avoid unwanted vibrations or the like.

Moving to step 540, the controller detects if the interface device is actuated and/or detects if the controller receives an input from the interface. If the controller does not detect actuation and/or receive an input signal, the controller maintains the standby frequency of the VFD signal, and the operation of the controller stays on step 540. In some examples, a different signal (e.g., a power off signal) can end the looping of step 540.

If the controller does detect actuation and/or receive an input signal, the controller continues with step 550. In step 550, the controller adjusts the frequency of the VFD signal from the standby frequency to the operating frequency. The operation of the controller then returns to 510 in which the controller provides a VFD signal to the motor based on the received input from the interface device. A person of ordinary skill will understand that other operations of the controller are contemplated, and that this disclosure is not limited to the example of FIG. 5.

Various non-limiting embodiments have been described. These and others are within the scope of the following claims.

The invention claimed is:

1. A material handler comprising:
a motor configured to move one or more components of the material handler;
an interface device; and a controller in communication with the motor and the interface device and configured to:
receive an input from the interface device;
provide a variable frequency drive (VFD) signal to the motor to control movement of the one or more components of the material handler based on the received input, the VFD signal having an operating frequency; and
if the interface device is inactive for a predetermined amount of time, adjust the frequency of the VFD signal from the operating frequency to a standby frequency, the standby frequency being lower than the operating frequency.

2. The material handler of claim 1, wherein the adjusting the frequency of the VFD signal from the operating frequency to the standby frequency comprises adjusting the frequency of the VFD signal from the operating frequency to one or more intermediate frequencies before adjusting the frequency of the VFD signal to the standby frequency, each of the one or more intermediate frequencies being between the operating frequency and the standby frequency.

3. The material handler of claim 2, wherein the adjusting the frequency of the VFD signal from the operating frequency to the standby frequency comprises reducing the frequency in a plurality of substantially equal steps.

4. The material handler of claim 2, wherein the adjusting the frequency of the VFD signal from the operating frequency to the standby frequency comprises ramping down the frequency at a substantially constant rate with the exception of skipping at least one predetermined frequency or range of frequencies that would otherwise be realized when reducing the frequency at the substantially constant rate.

5. The material handler of claim 4 wherein the ramping down the frequency at the substantially constant rate comprises between 0.25 Hz/second and 14 Hz/second.

6. The material handler of claim 2, wherein the adjusting the frequency of the VFD signal from the operating frequency to the standby frequency comprises ramping down the frequency at a substantially constant rate with the exception of skipping one range of frequencies, the skipped range of frequencies including a plurality of frequencies that would otherwise be realized when reducing the frequency at the substantially constant rate.

7. The material handler of claim 2, wherein the adjusting the frequency of the VFD signal from the operating frequency to the one or more intermediate frequencies comprises adjusting the frequency of the VFD signal to a plurality of predetermined intermediate frequencies in a predefined sequence.

8. The material handler of claim 1, wherein the standby frequency is greater than 0 Hz.

9. The material handler of claim 8, wherein the standby frequency is between 18 Hz and 30 Hz.

10. The material handler of claim 1, wherein the controller is further configured to, after adjusting the frequency of the VFD signal from the operating frequency to the standby frequency, detect activity of the interface device and, upon detecting the activity of the interface device, adjust the frequency of the VFD signal from the standby frequency to the operating frequency.

11. The material handler of claim 1, wherein the controller is configured to adjust the operating frequency from a first operating frequency to a second operating frequency.

12. The material handler of claim 11, wherein the controller is configured to receive a control signal from a remote device, and wherein the controller is configured to adjust the operating frequency from the first operating frequency to the second operating frequency in response to the received control signal.

13. The material handler of claim 12, further comprising a network connection interface in communication with the controller such that the controller can receive a control signal from a remote device via the network connection interface.

14. The material handler of claim 11, wherein the first operating frequency and the second operating frequency are selected from a predetermined list of available operating frequencies.

15. The material handler of claim 1, wherein the material handler comprises a knuckle boom loader.

16. The material handler of claim 1, wherein the interface device comprises one or more joysticks.

17. The material handler of claim 1, further comprising one or more valves, and wherein the controller is configured to provide the VFD signal to the one or more valves to control movement of one or more components of the material handler based on the received input.

18. A controller for a material handler device configured to:
provide a variable frequency drive (VFD) signal to a motor to effect operation of the motor, the VFD signal having an operating frequency;
detect actuation of an interface device and control the motor via the VFD signal based on the detected actuation of the interface device; and
if the interface device is idle for a predetermined amount of time, adjust the frequency of the VFD signal from the operating frequency to a standby frequency, the standby frequency being lower than the operating frequency.

19. The controller of claim 18, wherein adjusting the frequency of the VFD signal from the operating frequency to the standby frequency comprises:
adjusting the frequency of the VFD signal to each of one or more intermediate frequencies in a first set of intermediate frequencies between the standby frequency and the operating frequency; and
not adjusting the frequency of the VFD signal to any of one or more intermediate frequencies in a second set of intermediate frequencies between the standby frequency and the operating frequency.

20. The controller of claim 19, wherein adjusting the frequency of the VFD signal from the operating frequency to the standby frequency comprises ramping the frequency of the VFD signal from the operating frequency to the standby frequency at a constant rate with the exception of the intermediate frequencies in the second set of intermediate frequencies.

21. The controller of claim 19, wherein the second set of intermediate frequencies comprises one or more predetermined frequencies and/or frequency ranges.

22. The controller of claim 18, further configured to, after adjusting the frequency of the VFD signal to the standby frequency:
detect actuation of the interface device; and
upon detecting actuation of the interface device; adjust the frequency of the VFD signal from the standby frequency to the operating frequency.

* * * * *